C. H. PARSHALL.
LUBRICATOR.
No. 6,909. Reissued Feb. 8, 1876.
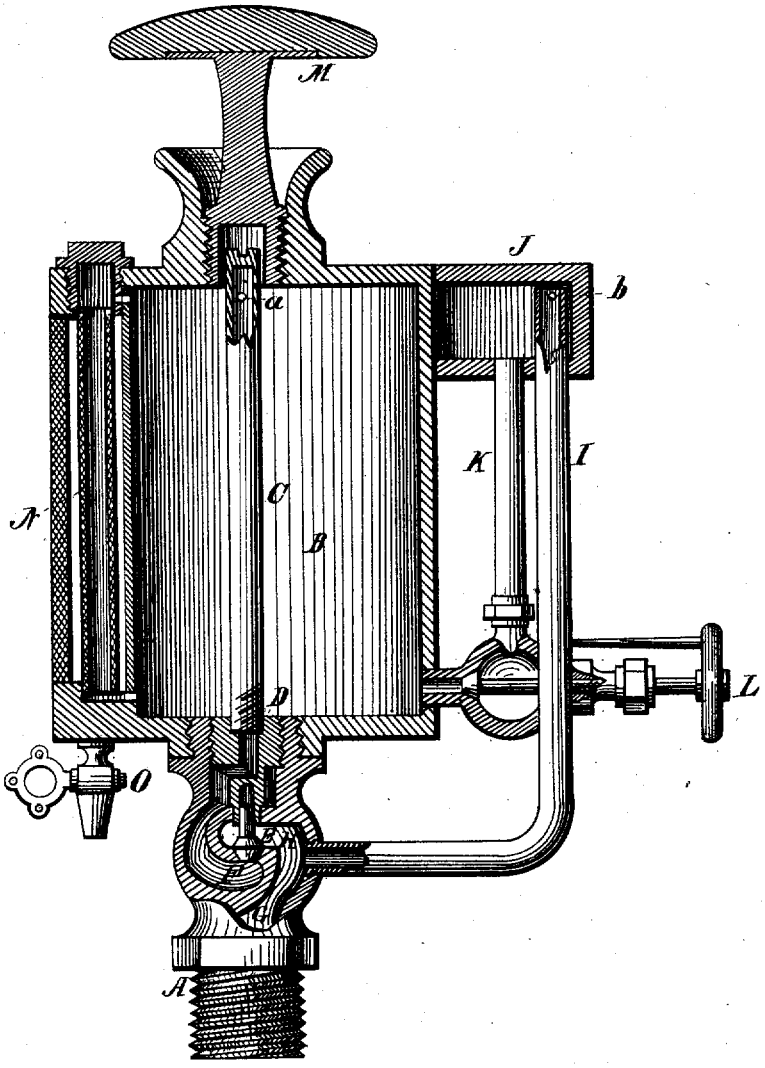
WITNESSES
E. A. Nottingham,
F. O. McCleary
By
INVENTOR
Charles H. Parshall.
By Leggett & Leggett.
Attorneys.
N. PETERS, PHOTO-LITHOGRAPHER, WASHINGTON, D. C.

UNITED STATES PATENT OFFICE.

CHARLES H. PARSHALL, OF DETROIT, MICHIGAN, ASSIGNOR, BY MESNE ASSIGNMENTS, TO HIMSELF AND JOHN R. GROUT, OF SAME PLACE.

IMPROVEMENT IN LUBRICATORS.

Specification forming part of Letters Patent No. 170,297, dated November 23, 1875; reissue No. 6,909, dated February 8, 1876; application filed January 25, 1876.

*To all whom it may concern:*

Be it known that I, CHARLES H. PARSHALL, of Detroit, in the county of Wayne and State of Michigan, have invented certain new and useful Improvements in Lubricators; and I do hereby declare the following to be a full, clear, and exact description of the invention, such as will enable others skilled in the art to which it pertains to make and use it, reference being had to the accompanying drawings, which form part of this specification.

My invention relates to improvements in lubricators for steam-engines; and it consists in the arrangement of parts, as hereinafter described, and as particularly specified in the claims.

In the drawings is represented a vertical central section of the apparatus complete.

Similar letters of reference indicate corresponding parts.

On description of same, A is the stem of the lubricator, which is attached to the steam-pipe, steam-chest, or cylinder; and it has an opening through it, by means of which the oil passes down to those parts. B is the cup or reservoir for holding the oil or other lubricant. C is a tube in the cup, for conveying the oil to the stem. It rises to the top of the cup, is closed at the upper end, and has an opening at *a*, just below the top, for passage of oil into the tube.

D is a guide-block in the upper part of the stem, and E is a check-valve in the bulb of the stem, the neck of the valve playing up and down in the end of the guide, which keeps the valve in place. The stem screws up into the bottom of the cup, the guide-block into the top of the stem, and the tube into the top of guide-block. A duct (the bore of tube C) continues down through the guide to below where it screws to the stem, where it passes to the outside of the guide, and thence on down to below the check-valve, forming the chamber F.

G is a partition in the bulb of the stem, containing the seat of valve E, and it separates the chamber F below the valve from chamber H above it. The seat of valve E is in chamber H, and this chamber is always filled with steam from below, the pressure of which holds the valve to its seat.

I is a tube extending up from chamber H in the stem, outside of cup B, into chamber J. This tube extends up through the bottom to near the top of this chamber. It is open at both ends, for the free entrance of steam, and it has an opening at *b* below, for the discharge of water.

J is a chamber for the condensation of steam. Its upper face is level with that of the cup, and it is supported in place by tubes I and K. Steam from below is in constant communication with this chamber. Its condensation is, therefore, always taking place there. The water does not rise in the chamber above discharge-opening *b*.

K is a tube conveying water of condensation from chamber J into cup B. It does not rise above the inner surface of the bottom of the condensing-chamber, and it connects with the oil-cup at the bottom.

L is a regulating feed-valve in the lower part of the tube K, by which the water is admitted to the cup.

M is a screw-stop at the top of the cup, for introducing the oil or other lubricant.

N is a glass tube, indicating quantity of oil. It is recessed into the side of the cup, connected with the cup by ducts at each end, and is inclosed by a glass face.

O is a waste-cock at bottom of cup, for drawing off the water.

The operation of this arrangement of the parts is as follows: Valve L is closed, and the lubricant is put into the cup B, filling the same up, or nearly, to opening *a*. This valve is then slightly opened, when the water formed in chamber J and standing in tube K enters through the valve to cup B, and floats the oil up to and through opening *a* into tube C. There is then a pressure of steam in chamber F only slightly inferior to its pressure in H, and the oil passing down the tube into F, it there acts, by its weight, to raise check-valve E as soon as the pressure of the column of oil exceeds the weight of the valve, and the valve remains open till the column of oil has so far run below that the weight of the valve predominates, when it closes again. The admission of water to the cup is so regulated by valve L as to produce a steady flow of oil, and give this alternating action to the check-valve, passing the oil below as wanted.

Opening *b* in tube I is placed at or slightly below the level of opening *a* in tube C, so that the water in the condensing-chamber shall flow out at that level through opening *b* and down tube I.

Opening *b* must not be higher than opening *a*, as the superior weight of water in equal columns is always sufficient to float the oil; and it is desirable, in regulating the feed of water at L, that its pressure be but slightly more than that of the oil.

Having thus described my invention, I claim as new and desire to secure by Letters Patent—

1. In combination with the oil-reservoir B and stem A, the separate condensing-chamber J, placed upon the outside of the reservoir, at the top edge thereof, and communicating with stem A through steam-pipe I, and with the bottom of reservoir B through water-pipe K, as and for the purposes described.

2. In combination with the condenser J and stem A, the steam-pipe I, open at both ends, provided with discharge-opening *b* below the upper end thereof, and connecting from chamber H in stem A to condenser J, as and for the purposes described.

3. In combination with the reservoir B and separate condensing-chamber J, placed at the outside top portion thereof, the water-pipe K, with hand-valve L, communicating from bottom of condenser to bottom of reservoir, as and for the purposes described.

4. In combination with the reservoir B and pipe C, closed at top, and provided with opening *a* and stem A, with an enlarged or bulbed upper portion, constructed with chambers F H, partition G, and automatic valve E, as and for the purposes described.

5. In combination with the stem A, constructed with chambers F H, partition G, and automatic valve E, the guide-block D, screwed down into the stem A, and tube C secured thereto, as and for the purposes described.

6. The improved lubricator, consisting of reservoir B, stem A, oil-tube C, closed at top and provided with opening *a*, condensing-chamber J, placed at the outside top portion of reservoir, steam-pipe I, open at top and communicating from stem A to top of condenser, and water-pipe K, with hand-valve L, communicating from bottom of condenser to bottom of reservoir, as and for the purposes described.

In testimony that I claim the foregoing I have herewith set my hand this 29th day of December, 1875.

CHARLES H. PARSHALL.

Witnesses:

JOHN B. CORLISS,
S. W. STEWART.